US011965758B2

(12) United States Patent
Nakamura et al.

(10) Patent No.: US 11,965,758 B2
(45) Date of Patent: Apr. 23, 2024

(54) BRILLOUIN OPTICAL SENSING DEVICE AND OPTICAL SENSING METHOD (71) Applicant: NIPPON TELEGRAPH AND TELEPHONE CORPORATION, Tokyo (JP)

(72) Inventors: Atsushi Nakamura, Musashino (JP); Chihiro Kito, Musashino (JP); Daisuke Iida, Musashino (JP); Junichi Kawataka, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/923,263

(22) PCT Filed: May 21, 2020

(86) PCT No.: PCT/JP2020/020044
§ 371 (c)(1),
(2) Date: Nov. 4, 2022

(87) PCT Pub. No.: WO2021/234887
PCT Pub. Date: Nov. 25, 2021

(65) Prior Publication Data
US 2023/0236044 A1 Jul. 27, 2023

(51) Int. Cl.
*G01D 5/353* (2006.01)
(52) U.S. Cl.
CPC .............. *G01D 5/35364* (2013.01)
(58) Field of Classification Search
CPC ........ G01D 5/35364; G01D 5/35358; G01D 5/34792; G01D 5/34354; G01D 5/35338;
(Continued)

(56) References Cited

U.S. PATENT DOCUMENTS 6,625,365 B2 * 9/2003 Yamano .................. G02B 6/448
385/128
8,013,986 B2 * 9/2011 Hartog ............... G01D 5/35364
356/73.1
(Continued)

FOREIGN PATENT DOCUMENTS

CN 104729750 A 6/2015
CN 104729751 A 6/2015
(Continued)

OTHER PUBLICATIONS

T. Kurashima, T. Horiguchi, H. Izumita, and Y. Koyamada, "Brillouin optical-fiber time domain reflectometry", IEICE Trans. Commun., E76-B, No. 4, pp. 382-390 (1993).
(Continued)

*Primary Examiner* — John R Lee
(74) *Attorney, Agent, or Firm* — Harness, Dickey & Pierce, P.L.C.

(57) ABSTRACT

An object of the present invention is to provide a Brillouin optical sensing device and an optical sensing method capable of reducing introduction costs. The Brillouin optical sensing device according to the present invention includes: a sensing fiber 90 in which a plurality of optical fibers having Brillouin frequency shift characteristics different from each other are arranged in parallel; an optical measuring instrument 11 that launches an optical pulse into at least two of the optical fibers of the sensing fiber 90 to generate Brillouin scattering lights and measures a beat frequency of a beat signal between the Brillouin scattering lights at any position of the sensing fiber 90; and an arithmetic processing unit 12 that acquires a physical quantity of the sensing fiber 90 at said any position based on the beat frequency acquired by the optical measuring instrument 11.

6 Claims, 6 Drawing Sheets (58) Field of Classification Search
CPC ...... G01D 5/353; G01D 5/268; G01D 5/3537; G01D 5/35374; G01D 5/35383; G01D 5/3539; G01D 5/35396
See application file for complete search history.

(56) References Cited

U.S. PATENT DOCUMENTS

| | | | | |
|---|---|---|---|---|
| 8,134,696 | B2* | 3/2012 | Hartog | G01M 11/319 356/73.1 |
| 8,928,868 | B2* | 1/2015 | Takahashi | G01M 11/319 356/73.1 |
| 8,988,671 | B2* | 3/2015 | Zhang | G01D 5/35364 356/73.1 |
| 10,274,345 | B2* | 4/2019 | Lanticq | G01D 5/35358 |
| 10,584,982 | B2* | 3/2020 | Handerek | G01K 11/32 |
| 11,015,961 | B2* | 5/2021 | Handerek | G01D 5/35383 |
| 11,391,622 | B2* | 7/2022 | Ip | G01H 9/004 |
| 2010/0002226 | A1* | 1/2010 | Hartog | G01M 11/319 356/73.1 |
| 2017/0248448 | A1* | 8/2017 | Horiguchi | H01S 5/0085 |
| 2019/0025095 | A1* | 1/2019 | Steel | G01D 5/35358 |
| 2020/0173818 | A1* | 6/2020 | Handerek | G01K 11/32 |
| 2020/0233107 | A1* | 7/2020 | Constantinou | G01K 11/32 |
| 2020/0249076 | A1* | 8/2020 | Ip | G01H 9/004 |
| 2022/0381589 | A1* | 12/2022 | Tezuka | G01M 11/30 |
| 2023/0031203 | A1* | 2/2023 | Kumagai | G01M 11/319 |
| 2023/0236044 | A1* | 7/2023 | Nakamura | G01D 5/35364 250/227.14 |
| 2023/0288232 | A1* | 9/2023 | Koizumi | G01D 5/35364 250/227.14 |

FOREIGN PATENT DOCUMENTS

| | | |
|---|---|---|
| JP | 2009-098020 A | 5/2009 |
| JP | 2016-102689 A | 6/2016 |

OTHER PUBLICATIONS

Zhiyong Zhao, Marcelo A. Soto, Ming Tang, and Luc Thevenaz, "Distributed shape sensing using Brillouin scattering in multi-core fibers", Opt. Express 24, 25211-25223, Oct. 31, 2016.

* cited by examiner

BRILLOUIN OPTICAL SENSING DEVICE AND OPTICAL SENSING METHOD

CROSS-REFERENCE TO RELATED APPLICATIONS

This application is a 371 U.S. National Phase of International Application No. PCT/JP2020/020044, filed on May 21, 2020. The entire disclosure of the above application is incorporated herein by reference.

TECHNICAL FIELD

The present disclosure relates to a sensing device and a sensing method using a Brillouin optical sensing technique.

BACKGROUND ART

The Brillouin optical sensing technique is a technique for monitoring strain and vibration applied to an optical fiber and a change in temperature by measuring a change in Brillouin frequency shift (BFS). As an device and method for realizing the Brillouin optical sensing technique, for example, Brillouin optical time domain reflectometry (BOTDR) described in NPL 1 has been known. In BOTDR, an optical pulse is launched into an optical fiber to be measured, and a time response of Brillouin scattering light generated in the measured optical fiber is analyzed.

By measuring from one end of the optical fiber using BOTDR, distributions of changes in temperature and strain in the longitudinal direction of the optical fiber attached to a structure or the like can be continuously obtained. Because of this feature, it is anticipated that BOTDR will be applied to health monitoring of social infrastructure or the like.

CITATION LIST

Non Patent Literature

[NPL 1] T. Kurashima, T. Horiguchi, H. Izumita, and Y. Koyamada, "Brillouin optical-fiber time domain reflectometry," IEICE Trans. Commun., E76-B, no. 4, pp. 382-390 (1993).

[NPL 2] Zhiyong Zhao, Marcelo A. Soto, Ming Tang, and Luc Thevenaz, "Distributed shape sensing using Brillouin scattering in multi-core fibers," Opt. Express 24, 25211-25223 (2016)

SUMMARY OF THE INVENTION

Technical Problem

Unlike optical time domain reflectometry (OTDR), which has become widespread, the spread of BOTDR as an optical sensing device is still limited. One of the reasons is that a configuration of a BOTDR device is more complicated than that of an OTDR device, and introduction costs of a measuring device are high. In particular, a light receiving unit needed for measuring Brillouin scattering light needs a frequency bandwidth equal to or greater than 10 GHz in order to obtain the amount of Brillouin frequency shift in an optical fiber. Consequently, the components of the measuring device become expensive. That is, the Brillouin optical sensing device has a problem in that introduction costs are difficult to be reduced.

To solve the above problem, an object of the present invention is to provide a Brillouin optical sensing device and an optical sensing method capable of reducing introduction costs.

Means for Solving the Problem

To solve the above problem, the present invention uses two optical fibers having different BFS characteristics and arranged in parallel as a sensor medium in Brillouin optical sensing, and measures and analyzes a beat signal obtained by multiplexing Brillouin scattering lights of the optical fibers.

Specifically, a Brillouin optical sensing device according to the present invention includes: a sensing fiber in which a plurality of optical fibers having Brillouin frequency shift characteristics different from each other are arranged in parallel; an optical measuring instrument that launches an optical pulse into at least two of the optical fibers of the sensing fiber to generate Brillouin scattering lights and measures a beat frequency of a beat signal between the Brillouin scattering lights at any position of the sensing fiber; and an arithmetic processing unit that acquires a physical quantity of the sensing fiber at said any position based on the beat frequency acquired by the optical measuring instrument.

In addition, an optical sensing method according to the present invention includes: launching an optical pulse into an individual optical fiber of a sensing fiber in which a plurality of optical fibers having Brillouin frequency shift characteristics different from each other are arranged in parallel and generating Brillouin scattering lights in the respective optical fibers; measuring a beat frequency of a beat signal of each of the Brillouin scattering lights at any position of the sensing fiber, and acquiring a physical quantity of the sensing fiber at said any position based on the beat frequency.

The present Brillouin optical sensing device and the present optical sensing method measure and analyze a beat signal obtained by multiplexing Brillouin scattering lights in at least two optical fibers having different BFS characteristics and arranged in parallel so that the frequency bandwidth needed by reception units in an optical stage and an electrical stage can be made narrower than that of the conventional art. That is, the frequency band of the reception units does not need to be expanded, and the cost of Brillouin optical sensing can thus be reduced.

Therefore, the present invention can provide the Brillouin optical sensing device and the optical sensing method capable of reducing introduction costs.

In addition, the Brillouin optical sensing device according to the present invention further includes: a storage unit that stores a correspondence relationship between the beat frequency and a physical quantity of the sensing fiber, and the arithmetic processing unit acquires a physical quantity of the sensing fiber by comparing a beat frequency acquired by the optical measuring instrument with the correspondence relationship stored in the storage unit.

Furthermore, the plurality of optical fibers of the sensing fiber of the Brillouin optical sensing device according to the present invention are coated optical fibers constituting an optical fiber ribbon or an optical cable. The present Brillouin optical sensing device can use an optical fiber ribbon manufactured on a general manufacturing line as a sensing fiber so that further cost reduction can be achieved.

The optical measuring instrument of the Brillouin optical sensing device according to the present invention launches an optical pulse into three or more of the optical fibers of the sensing fiber, and the arithmetic processing unit acquires a physical quantity of the sensing fiber at a beat frequency at which a variation with respect to a change in physical quantity of the sensing fiber is the largest or the smallest among beat frequencies of beat signals between the Brillouin scattering lights. By increasing sensitivity or decreasing sensitivity with respect to a change in physical quantity of the sensing fiber, the physical quantity can be appropriately measured.

Effects of the Invention

The present invention provides a Brillouin optical sensing device and an optical sensing method capable of reducing introduction costs.

DESCRIPTION OF EMBODIMENTS

Hereinafter, embodiments of the present invention will be described with reference to the drawings. Note that the present invention is not limited to the embodiments, which will be described below. These embodiments are merely examples, and the present invention can be implemented in various modified or improved forms base on the knowledge of those skilled in the art. The same constituent elements are denoted by the same reference numerals in the present description and the drawings.

Embodiment 1

Figure 1:
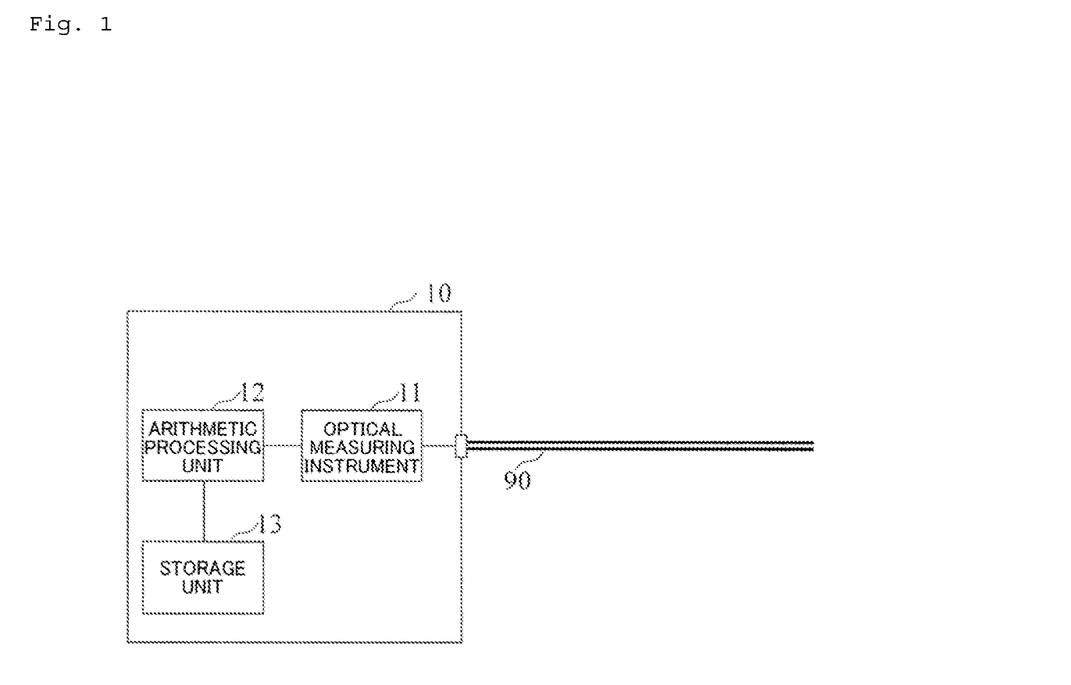
FIG. 1 is a diagram illustrating a Brillouin optical sensing device according to the present invention.

FIG. 1 is a diagram illustrating a Brillouin optical sensing device 10 according to the present embodiment. The Brillouin optical sensing device 10 includes: a sensing fiber 90 in which a plurality of optical fibers having Brillouin frequency shift characteristics different from each other are arranged in parallel; an optical measuring instrument 11 that launches an optical pulse into at least two of the optical fibers of the sensing fiber 90 to generate Brillouin scattering lights and measures a beat frequency of a beat signal between the Brillouin scattering lights at any position of the sensing fiber 90; and an arithmetic processing unit 12 that acquires a physical quantity of the sensing fiber 90 at said any position based on the beat frequency acquired by the optical measuring instrument 11.

In the present embodiment, the "physical quantity" will be described in terms of the temperature, the strain amount, or the curvature of the optical fiber. However, the "physical quantity" is not limited to the present example and may be any quantity as long as the quantity can be detected by the Brillouin scattering light.

The sensing fiber 90 is a measured optical fiber group 90 including two or more optical fibers arranged in parallel. The sensing fiber 90 is used as a sensor medium and is set in a place or object where the temperature, the amount of strain, or the curvature of an optical fiber is measured. Here, at least two optical fibers included in the sensing fiber 90 and used for measurement need to satisfy the following two conditions about Brillouin scattering characteristics.

Condition 1: to exhibit different BFS under the condition of the same temperature, the same strain, or the same curvature.

Condition 2: to exhibit a difference in change amount of BFS with respect to a change in temperature, a change in strain, or a change in curvature.

In general, BFS of an optical fiber under the condition of certain temperature or strain is expressed by the following formula (1).

[Math. 1]

$$v_B = \frac{2nV_a}{\lambda} \qquad \text{(Formula 1)}$$

In Formula (1), $v_B$ represents BFS, n represents the refractive index of the optical fiber, $V_a$ represents the sound speed in the optical fiber, and $\lambda$ represents the wavelength.

BFS changes linearly with respect to a change in temperature or strain, and this is expressed by the following formulas (2) and (3).

[Math. 2]

$$v_B(\varepsilon)=v_B(0)[1+C_s\varepsilon] \qquad \text{(Formula 2)}$$

$$v_B(t)=v_B(t_r)[1+C_t(1-t_r)] \qquad \text{(Formula 3)}$$

In Formulas (2) and (3), $\varepsilon$ represents the amount of strain applied to the optical fiber, t represents the temperature of the optical fiber, and $t_r$ represents reference temperature. $C_s$ and $C_t$ represent proportionality coefficients of strain and temperature.

In addition, since there is a correlation between the curvature of the optical fiber and the strain amount (for example, refer to NPL 2), a change in curvature of the optical fiber can also be derived based on a change in strain.

As in Formula (1), the above condition 1 can be easily satisfied by using optical fibers having different refractive indexes or different cross-sectional refractive index profiles that affect the sound speed. The above condition 2 can be satisfied by having $C_s$ and $C_t$ in Formulas (2) and (3) different from each other by using a 2-core optical fiber, and since $C_s$ and $C_t$ are also characteristics associated with the sound speed in the optical fiber, as with the condition 1, the condition 2 can be easily satisfied.

Figure 5:
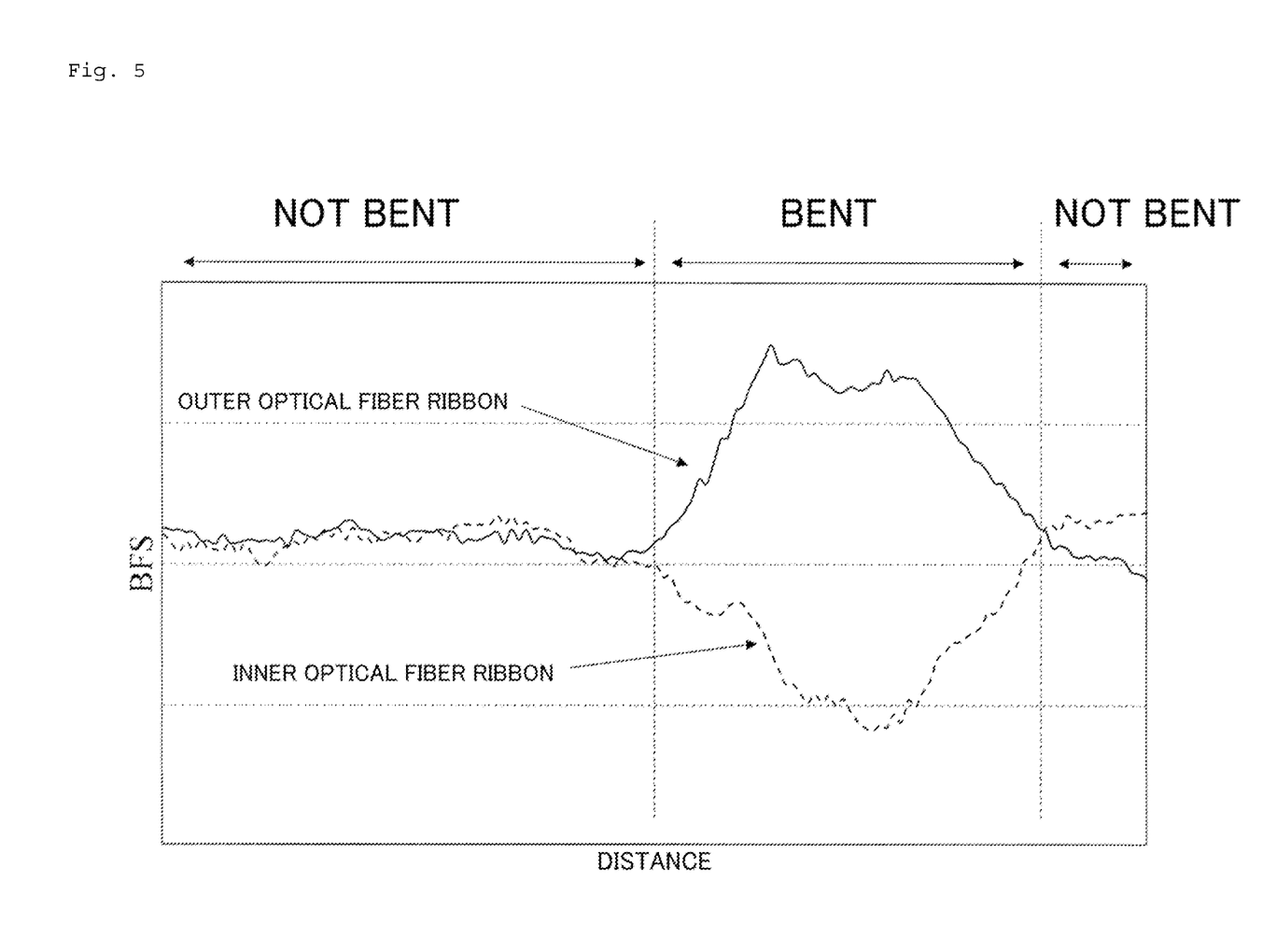
FIG. 5 is a diagram illustrating BFS of the inner optical fiber ribbon and the outer optical fiber ribbon, the BFS being generated when the optical fiber ribbon including optical fibers having the same characteristics is bent.

Further, by forming coated optical fibers having the same characteristics into an optical fiber ribbon, a 2-core optical fiber ribbon satisfying the condition 1 can be obtained. An example is given in FIG. 5. FIG. 5 is a diagram illustrating BFS of the inner optical fiber ribbon and the outer optical fiber ribbon, the BFS being generated when the optical fiber ribbon including optical fibers having the same characteristics is bent. That is, a 2-core optical fiber ribbon, which is one of the commercially available optical fiber ribbons manufactured by a commonly used manufacturing process can be used as the sensing fiber 90 for measuring a change in strain or a change in curvature of an optical fiber.

In addition, the method of obtaining a 2-core optical fiber ribbon having different BFS characteristics by forming coated optical fibers having the same characteristics into an optical fiber ribbon is also applied to the case of forming coated optical fibers into a cable. That is, a commercially available optical cable manufactured by a commonly used manufacturing process can also be used as the sensing fiber 90.

Thus, the Brillouin optical sensing device 10 can measure a change in strain or a change in curvature of an optical fiber by using a commercially available optical fiber ribbon or optical cable without using an expensive multicore optical fiber disclosed in NPL 2 as a sensing fiber.

Figure 2:
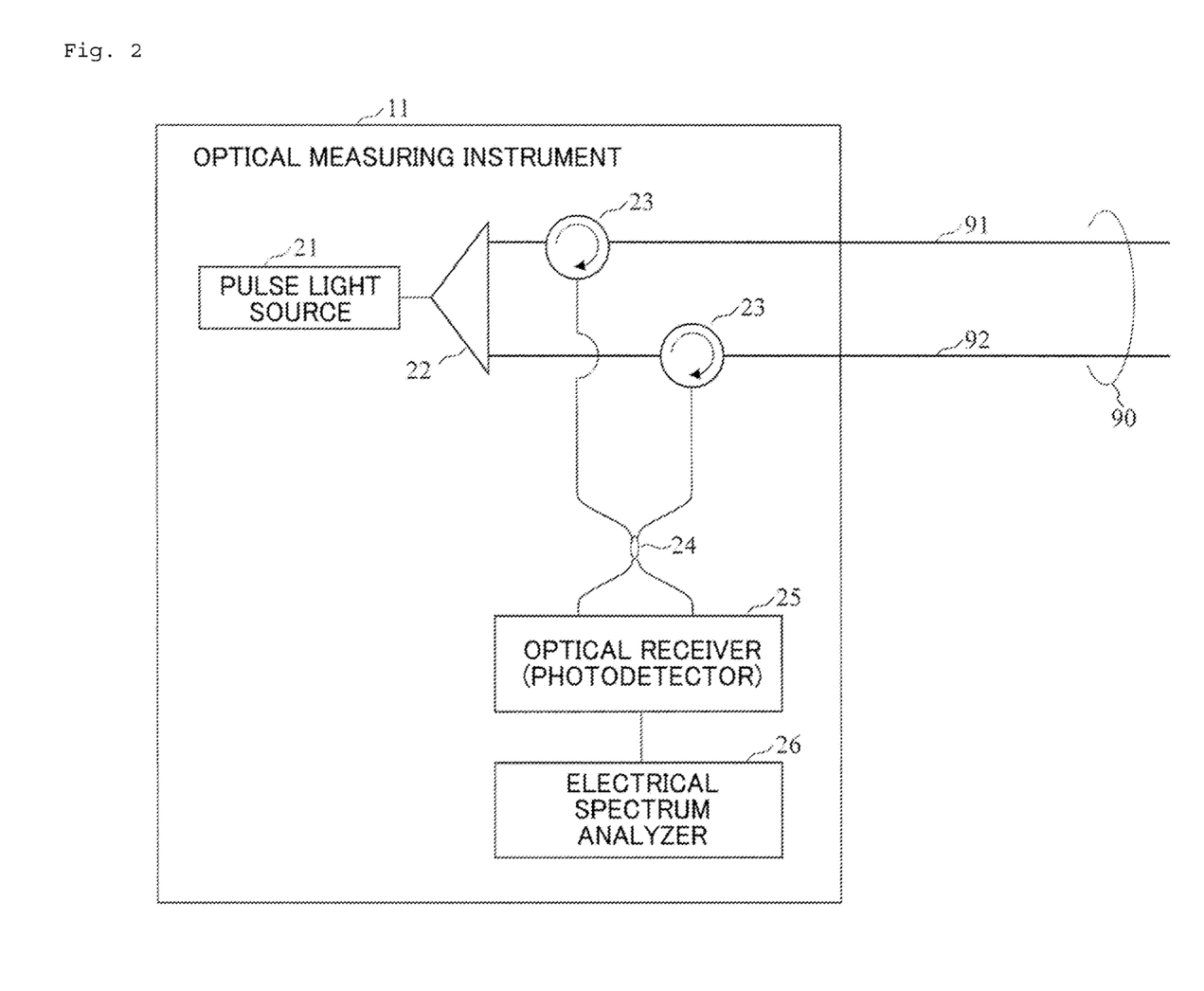
FIG. 2 is a diagram illustrating an optical measuring instrument of the Brillouin optical sensing device according to the present invention.

The optical measuring instrument 11 measures a beat frequency of a beat signal of Brillouin scattering light generated in each of the two optical fibers included in the sensing fiber 90 when an optical pulse is launched into the optical fibers. FIG. 2 is a diagram illustrating a configuration example of the optical measuring instrument 11. The optical measuring instrument 11 includes a pulse light source 21, an optical branching unit 22, a plurality of optical circulators 23, an optical coupler 24, an optical receiver 25, and an electrical spectrum analyzer 26. A test optical pulse output from the pulse light source 21 is launched into two optical fibers (91, 92) of the sensing fiber 90 via the optical branching unit 22 and the optical circulators 23 (the present embodiment is an example in which there are two optical fibers). Scattering lights generated in the two respective optical fibers (91, 92) are multiplexed by the optical coupler 24 after passing through the optical circulators 23. The multiplexed light is photoelectrically converted by the optical receiver 25. The photoelectrically converted signal is input to the electrical spectrum analyzer 26. The electrical spectrum analyzer 26 measures a beat frequency of a Brillouin scattering light component generated in each of the two optical fibers (91, 92).

The optical measuring instrument 11 can measure a beat frequency between the Brillouin scattering lights generated at any positions of the two optical fibers (91, 92) by controlling timing at which the test optical pulse is launched into the sensing fiber 90 and timing at which the electrical spectrum analyzer 26 measures the beat frequency. That is, the optical measuring instrument 11 can measure beat frequency distribution data in the longitudinal direction of the sensing fiber 90 by performing the timing control operation.

The point of the present invention is to set a difference in frequency shift (beat frequencies) of the Brillouin scattering lights generated in the two respective optical fibers (91, 92) to a small value of approximately several MHz to 1 GHz within an assumed change range of measured temperature or strain. Since the values of beat frequencies to be measured are small, the frequency band needed for the optical receiver 25 and the electrical spectrum analyzer 26 can be made narrower than the frequency band needed for the conventional BOTDR (usually, 10 GHz or more). That is, since an optical receiver and an electrical spectrum analyzer that are inexpensive and have a narrow frequency band can be sufficiently used as the optical receiver 25 and the electrical spectrum analyzer 26 of the optical measuring instrument 11, the cost of the Brillouin optical sensing device 10 can be reduced.

In addition, since thermal noise generated in the optical receiver increases in proportion to the receivable band, the optical receiver 25 having a narrow reception band can reduce the thermal noise and improve the measurement accuracy of the Brillouin optical sensing device 10.

The arithmetic processing unit 12 calculates a temperature distribution or a strain distribution of the sensing fiber 90 or a curvature distribution of the optical fiber by using the beat frequency measured by the optical measuring instrument 11. Specifically, the Brillouin optical sensing device 10 further includes a storage unit 13 that stores a correspondence relationship between the beat frequency and the physical quantity of the sensing fiber 90, and the arithmetic processing unit 12 compares the beat frequency acquired by the optical measuring instrument 11 with the correspondence relationship stored in the storage unit 13 to acquire the physical quantity of the sensing fiber 90.

The storage unit 13 stores a relationship between the beat frequency and the temperature, the strain amount, or the curvature of the optical fiber, which are measured in advance using the sensing fiber 90.

Figure 3:
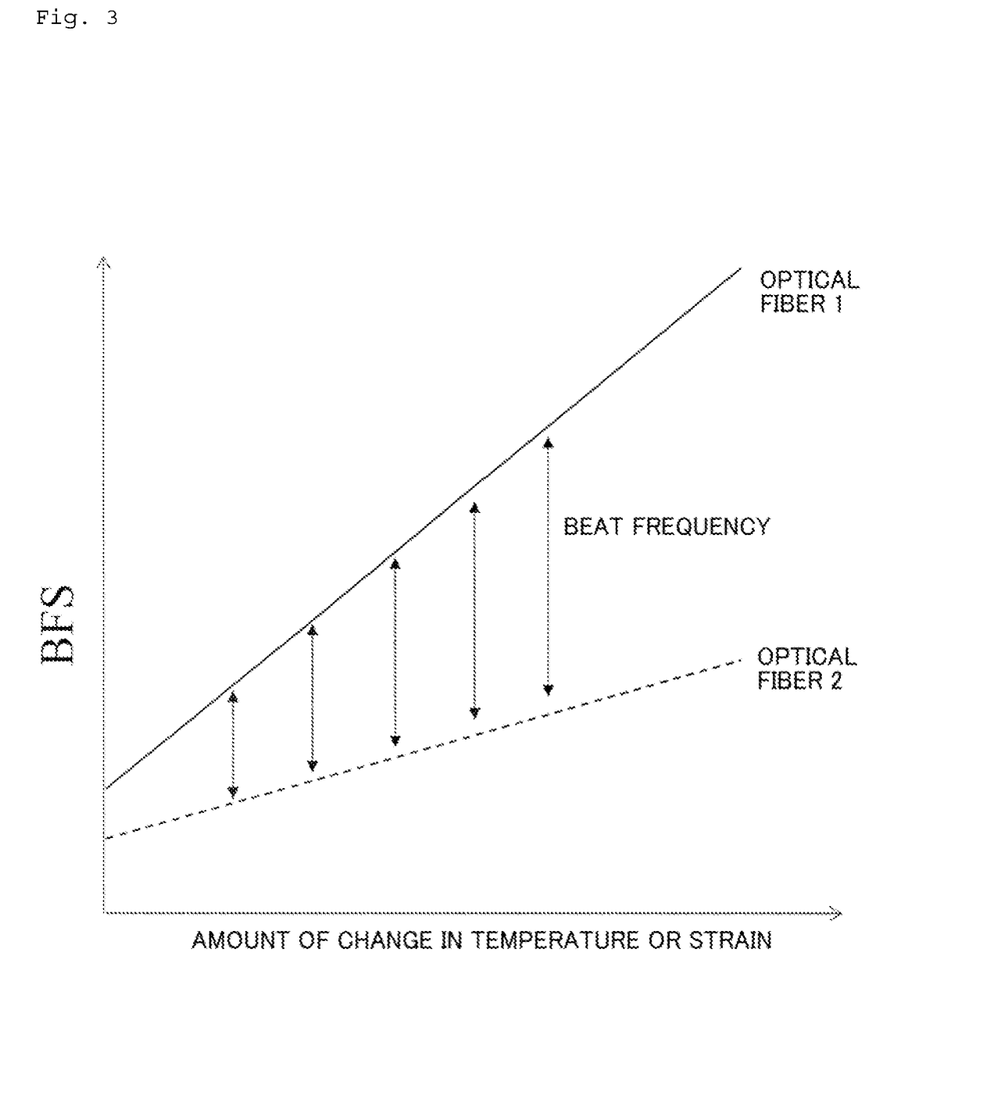
FIG. 3 is a diagram illustrating a relationship between temperature or strain of a sensing fiber and BFS.

FIG. 3 is a diagram illustrating an example of the relationship between temperature or strain of the sensing fiber 90 and BFS. The Brillouin optical sensing device 10 needs to measure the characteristics illustrated in FIG. 3 in advance and store the measured characteristics in the storage unit 13. To satisfy the above conditions 1 and 2, the beat signal of the Brillouin scattering light generated in each of the optical fibers has a finite frequency. The arithmetic processing unit 12 can measure the amount of change in temperature or strain by comparing the relationship between the beat frequency and the temperature, the strain amount, or the curvature of the optical fiber stored in the storage unit 13 with the measured value.

The correspondence relationship stored in the storage unit 13 is obtained by measuring in advance a BFS change amount generated when a known change in temperature, in strain amount, or in curvature of the optical fiber is given to each optical fiber included in the sensing fiber 90.

Figure 4:
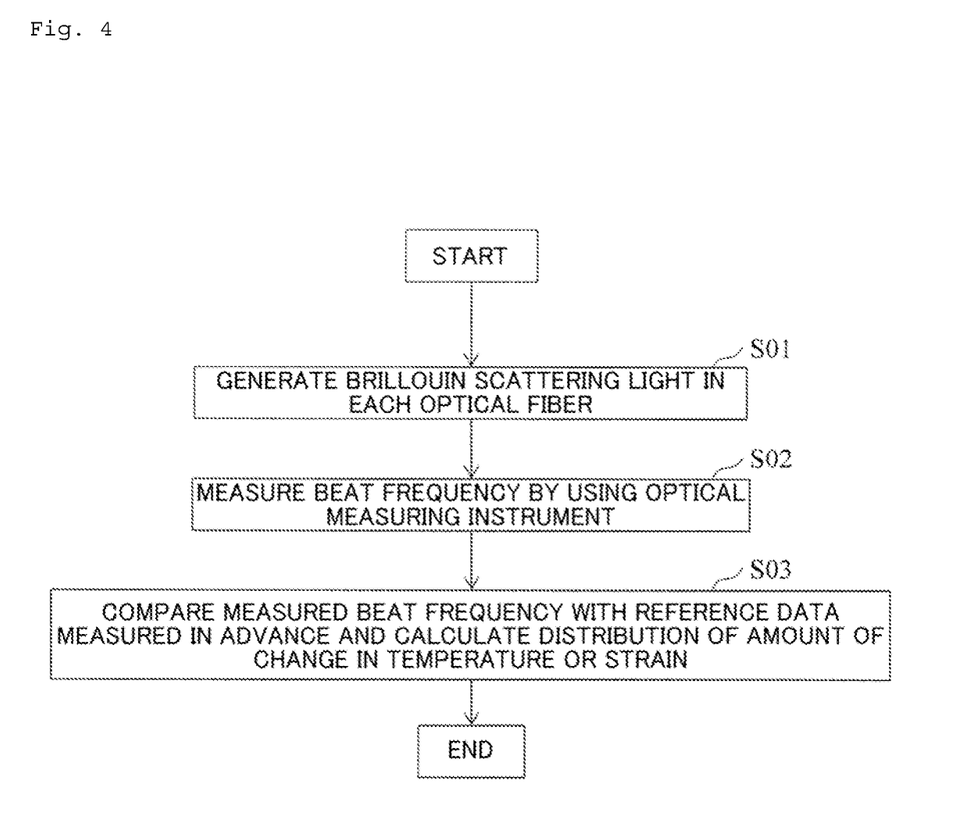
FIG. 4 is a diagram illustrating an optical sensing method according to the present invention.

FIG. 4 is a flowchart illustrating an optical sensing method performed by the Brillouin optical sensing device 10. The present optical sensing method includes: launching an optical pulse into the individual optical fiber of the sensing fiber 90 in which the plurality of optical fibers having Brillouin frequency shift characteristics different from each other are arranged in parallel and generating Brillouin scattering lights in the respective optical fibers (step S01); measuring a beat frequency of a beat signal of each of the Brillouin scattering lights at a any position of the sensing fiber 90 (step S02), and acquiring a physical quantity of the sensing fiber 90 at said any position based on the beat frequency (step S03).

Step S01: the optical measuring instrument 11 launches an optical pulse into two or more optical fibers of the sensing fiber 90.

Step S02: the optical measuring instrument 11 measures beat frequencies of Brillouin scattering lights generated in the plurality of optical fibers.

Step S03: the arithmetic processing unit 12 compares the measured beat frequency with reference data of the temperature, the strain amount, or the curvature of the optical fiber that has been measured in advance and calculates a distribution of the change amount of temperature or strain of the sensing fiber 90.

As described above, the present invention can provide the Brillouin optical sensing device and the Brillouin optical sensing method that can be implemented by an inexpensive reception unit so as to promote the Brillouin optical sensing technique using BOTDR.

Embodiment 2

In Embodiment 1, two optical fibers having different BFS characteristics are used as the sensing fiber 90. However, three or more optical fibers having different BFS characteristics may be used.

That is, the optical measuring instrument 11 of the Brillouin optical sensing device 10 according to the present embodiment launches an optical pulse into three or more of the optical fibers of the sensing fiber 90, and the arithmetic processing unit 12 acquires a physical quantity of the sensing fiber 90 at a beat frequency at which a variation with respect to a change in physical quantity of the sensing fiber 90 is the largest or the smallest among beat frequencies of beat signals between the Brillouin scattering lights.

Figure 6:
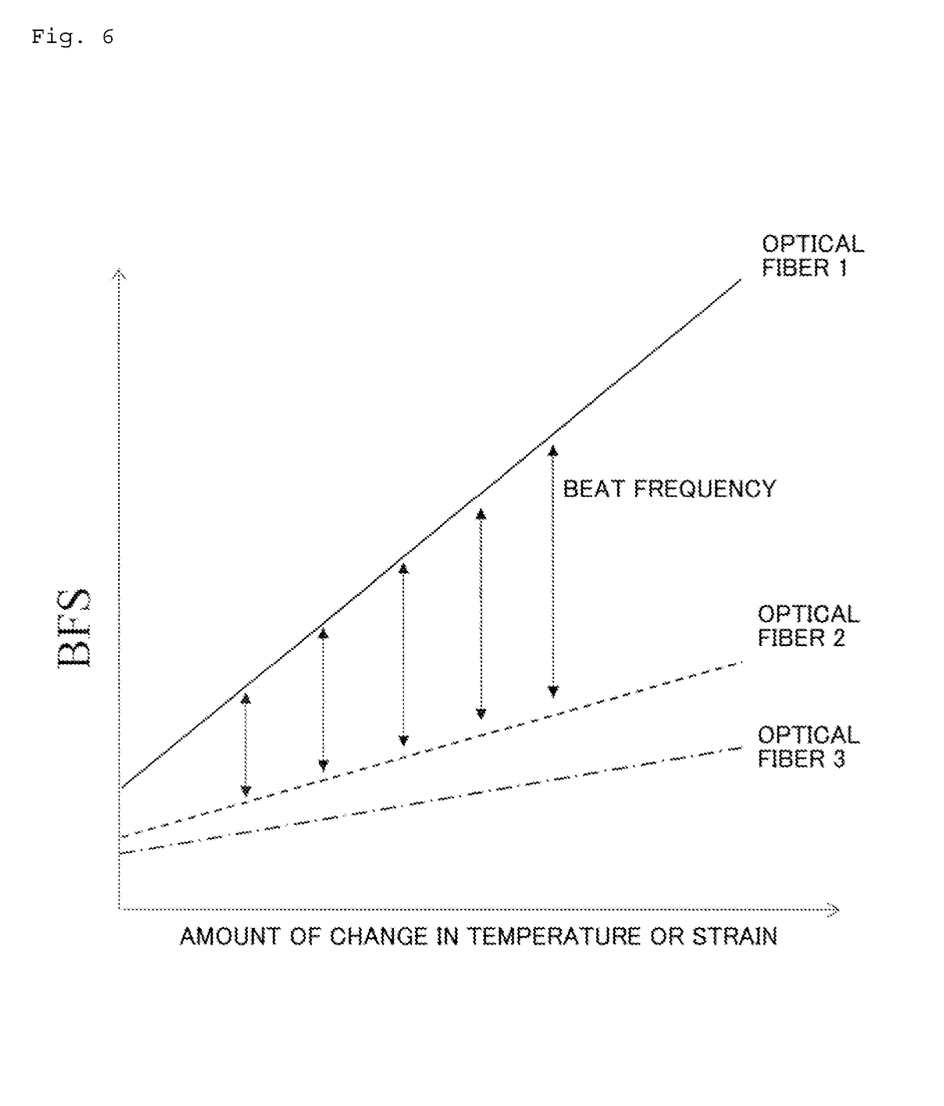
FIG. 6 is a diagram illustrating a relationship between temperature or strain of a sensing fiber and BFS.

A specific example will be described with reference to FIG. 6. FIG. 6 is a diagram illustrating the relationship between temperature or strain and BFS in a case where three optical fibers are included in a sensing fiber 90. For example, when a change in temperature or strain amount to be measured is small, a combination in which a beat frequency change with respect to a physical quantity change of a measurement target is large is used so as to improve sensitivity. Specifically, a beat frequency between an optical fiber 1 and an optical fiber 2 or an optical fiber 3 is used. Conversely, when a change in temperature or strain amount to be measured is large, a combination in which a beat frequency change with respect to a physical quantity change of a measurement target is small is used so as to reduce sensitivity. Specifically, a beat frequency between the optical fiber 2 and the optical fiber 3 is used.

OTHER EMBODIMENTS

The arithmetic processing unit 12 and the storage unit 13 of the Brillouin optical sensing device 10 can also be implemented by a computer and a program, and the program can be recorded in a recording medium or provided through a network.

The present invention is not limited to the above-described embodiments, and various modifications can be made without departing from the scope of the present invention.

In short, the present invention is not limited to the above-described embodiments as they are and can be embodied by modifying constituent elements without departing from the gist of the present invention in an implementation stage. In addition, various inventions can be formed by appropriately combining a plurality of constituent elements disclosed in the above embodiments. For example, some constituent elements may be deleted from all the constituent elements described in the embodiments. Furthermore, constituent elements of different embodiments may be combined as appropriate.

REFERENCE SIGNS LIST

10 Brillouin optical sensing device
11 Optical measuring instrument
12 Arithmetic processing unit
13 Storage unit
21 Pulse light source
22 Optical branching unit
23 Optical circulator
24 Optical coupler
25 Optical receiver
26 Electrical spectrum analyzer
90 Sensing fiber
91 Optical fiber
92 Optical fiber

The invention claimed is:

1. A Brillouin optical sensing device comprising:
a sensing fiber in which a plurality of optical fibers having Brillouin frequency shift characteristics different from each other are arranged in parallel;
an optical measuring instrument that launches an optical pulse into at least two of the optical fibers of the sensing fiber to generate Brillouin scattering lights and measures a beat frequency of one beat signal obtained from between the Brillouin scattering lights at any position of the sensing fiber; and
an arithmetic processing unit that acquires a physical quantity, that is one of temperature change, strain change and curvature change, of the sensing fiber at said any position based on the beat frequency of the one beat signal acquired by the optical measuring instrument.

2. The Brillouin optical sensing device according to claim 1, further comprising:
a storage unit that stores a correspondence relationship between the beat frequency and the physical quantity of the sensing fiber,
wherein the arithmetic processing unit acquires the physical quantity of the sensing fiber by comparing a beat frequency of the one beat signal acquired by the optical measuring instrument with the correspondence relationship stored in the storage unit.

3. The Brillouin optical sensing device according to claim 1, wherein the plurality of optical fibers of the sensing fiber are coated optical fibers constituting an optical fiber ribbon or an optical cable.

4. The Brillouin optical sensing device according to claim 1,
wherein the optical measuring instrument launches the optical pulse into three or more of the optical fibers of the sensing fiber, and
wherein the arithmetic processing unit acquires the physical quantity of the sensing fiber at the beat frequency at which a variation with respect to a change in the physical quantity of the sensing fiber is the largest among beat frequencies of beat signals obtained from between the Brillouin scattering lights.

5. The Brillouin optical sensing device according to claim 1,
wherein the optical measuring instrument launches the optical pulse into three or more of the optical fibers of the sensing fiber, and
wherein the arithmetic processing unit acquires the physical quantity of the sensing fiber at the beat frequency at which a variation with respect to a change in the physical quantity of the sensing fiber is the smallest among beat frequencies of beat signals between the Brillouin scattering lights.

6. An optical sensing method comprising:
launching an optical pulse into an individual optical fiber of a sensing fiber in which a plurality of optical fibers having Brillouin frequency shift characteristics different from each other are arranged in parallel and generating Brillouin scattering lights in the respective optical fibers;
measuring a beat frequency of one beat signal obtained from between the respective Brillouin scattering lights at any position of the sensing fiber, and acquiring a physical quantity, that is one of temperature change, strain change and curvature change, of the sensing fiber at said any position based on the beat frequency of the one beat signal.

\* \* \* \* \*